(12) United States Patent
Duanmu et al.

(10) Patent No.: US 12,656,171 B2
(45) Date of Patent: Jun. 16, 2026

(54) VIBRATION SENSOR AND ELECTRONIC EQUIPMENT

(71) Applicant: GOERTEK MICROELECTRONICS INC., Qingdao (CN)

(72) Inventors: Luyu Duanmu, Qingdao (CN); Junyu Tian, Qingdao (CN); Huabin Fang, Qingdao (CN)

(73) Assignee: GOERTEK MICROELECTRONICS INC., Qingdao (CN)

( * ) Notice: Subject to any disclaimer, the term of this patent is extended or adjusted under 35 U.S.C. 154(b) by 275 days.

(21) Appl. No.: 18/417,006

(22) Filed: Jan. 19, 2024

(65) Prior Publication Data

US 2024/0151576 A1 May 9, 2024

Related U.S. Application Data

(63) Continuation of application No. PCT/CN2022/104655, filed on Jul. 8, 2022.

(30) Foreign Application Priority Data

Jul. 20, 2021 (CN) .......................... 202110810452.6

(51) Int. Cl.
   *G01H 11/08* (2006.01)
   *H04R 7/00* (2006.01)
(52) U.S. Cl.
   CPC ............... *G01H 11/08* (2013.01); *H04R 7/00* (2013.01); *H04R 2201/003* (2013.01)
(58) Field of Classification Search
   CPC ..... G01H 11/08; H04R 7/00; H04R 2201/003
   USPC ......................................................... 73/658
   See application file for complete search history.

(56) References Cited

U.S. PATENT DOCUMENTS 9,794,661 B2 * 10/2017 Watson .................. H04R 17/02
2021/0219059 A1 7/2021 Qi et al.

FOREIGN PATENT DOCUMENTS

| CN | 208386931 U | | 1/2019 | |
| CN | 209945545 U | * | 1/2020 | |
| CN | 110972045 A | * | 4/2020 | ............. G01H 17/00 |
| CN | 210641062 U | | 5/2020 | |

(Continued)

OTHER PUBLICATIONS

Translation of CN-110972045-A (Year: 2020).*

(Continued)

*Primary Examiner* — Nathaniel T Woodward
(74) *Attorney, Agent, or Firm* — HAUPTMAN HAM, LLP

(57) ABSTRACT

Disclosed are a vibration sensor and an electronic equipment. The vibration sensor includes a circuit board assembly, a shell, a vibration pick-up assembly, a support shell and a chip assembly. The shell is configured to cover a side of the circuit board assembly to form an installation space. The vibration pick-up assembly is provided in the installation space, and is configured to pick up an external bone vibration and generate a response vibration. The support shell is connected to a side of the vibration pick-up assembly away from the circuit board assembly. The chip assembly is connected to a side of the support shell away from the circuit board assembly, and is electrically connected to the circuit board assembly. The vibration pick-up assembly, the support shell and the chip assembly are enclosed to form a conduction cavity.

8 Claims, 1 Drawing Sheet

(56)        References Cited

FOREIGN PATENT DOCUMENTS

| | | | |
|---|---|---|---|
| CN | 111510834 | A | 8/2020 |
| CN | 211930817 | U | 11/2020 |
| CN | 212110308 | U | 12/2020 |
| CN | 112333618 | A | 2/2021 |
| CN | 112565993 | A | 3/2021 |
| CN | 213403413 | U | 6/2021 |
| CN | 213694145 | U | 7/2021 |
| CN | 113447115 | A | 9/2021 |
| CN | 215217808 | U | 12/2021 |
| CN | 215344986 | U | 12/2021 |
| CN | 217155579 | U | 8/2022 |
| JP | H10126873 | A | 5/1998 |
| KR | 101657650 | B1 | 9/2016 |

OTHER PUBLICATIONS

Translation of CN-209945545-U (Year: 2020).*

First Office Action in Corresponding Chinese Application No. 202110810452.6, dated Dec. 28, 2024; 18 pgs.

Notice to Grant in Corresponding Chinese Application No. 202110810452.6, dated Oct. 28, 2025; 5 pgs.

International Search Report and Written Opinion in Corresponding International Application No. PCT/CN2022/104655, mailed Sep. 26, 2022; 22 pgs.

* cited by examiner

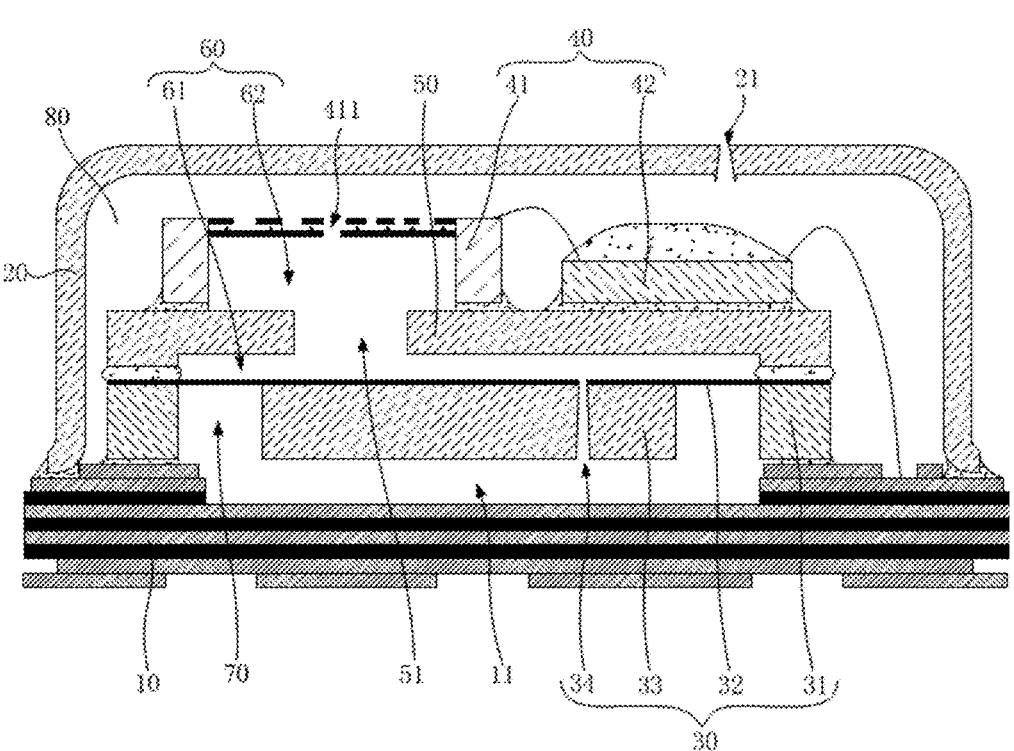

VIBRATION SENSOR AND ELECTRONIC EQUIPMENT

CROSS-REFERENCE TO RELATED APPLICATIONS

This application is a continuation application of International Application No. PCT/CN2022/104655, filed on Jul. 8, 2022, which claims priority to Chinese Patent Application No. 202110810452.6, filed on Jul. 20, 2021, the entire contents of which are incorporated herein by reference.

TECHNICAL FIELD

The present application relates to the technical field of sensors, and in particular to a vibration sensor and an electronic equipment to which the vibration sensor is applied.

BACKGROUND

The bone voiceprint sensor is a sensor that uses the diaphragm vibration to instigate air flow, then excites the MEMS diaphragm, and detects the flow signal. Therefore, the bone voiceprint sensor can be used to detect slight vibrations in the head and neck bones caused by a person speaking, thereby collecting sound signals and converting them into electrical signals. Different from the conventional method of collecting the sound through air conduction in the microphone, this method can transmit the sound with high clarity even in noisy environments.

In the related art, a bone voiceprint sensor usually includes a vibration pick-up unit and a microphone unit. The vibration pick-up unit is configured to pick up external bone vibrations and transmit them to the microphone unit. The microphone unit is configured to convert vibration signals into electrical signals. For the microphone unit, a plurality of circuit boards are usually enclosed to form an internal space, and a chip module is provided in the internal space. Therefore, there are a plurality of bonding positions between the plurality of circuit boards, resulting in a low product performance reliability. In addition, it is also necessary to punch on the circuit board to allow the chip module to communicate with the installation space, which results in the complex structure, lengthy manufacturing processes, high costs, and a lower product yield.

SUMMARY

The main purpose of the present application is to provide a vibration sensor, aiming to simplify the structure of the vibration sensor, reduce the processing difficulty and cost, and improve the structural reliability of the vibration sensor.

In order to solve the above objectives, the present application provides a vibration sensor which includes:

a circuit board assembly;

a shell configured to cover a side of the circuit board assembly to form an installation space;

a vibration pick-up assembly provided in the installation space, the vibration pick-up assembly being configured to pick up an external bone vibration and generate a response vibration;

a support shell connected to a side of the vibration pick-up assembly away from the circuit board assembly; and a chip assembly connected to a side of the support shell away from the circuit board assembly, the chip assembly being electrically connected to the circuit board assembly, and the vibration pick-up assembly, the support shell and the chip assembly being enclosed to form a conduction cavity.

In an embodiment of the present application, the chip assembly includes:

a micro-electromechanical system (MEMS) element connected to a side of the support shell away from the vibration pick-up assembly, the MEMS element, the support shell and the vibration pick-up assembly being enclosed to form the conduction cavity; and an application specific integrated circuit (ASIC) chip connected to the support shell, the ASIC chip being electrically connected to the MEMS element and the circuit board assembly respectively.

In an embodiment of the present application, the support shell and the vibration pick-up assembly are enclosed to form a first cavity, the MEMS element and the support shell are enclosed to form a second cavity, the support shell is provided with a vibration transmission through hole, and the first cavity communicates with the second cavity via the vibration transmission through hole to form the conduction cavity.

In an embodiment of the present application, the vibration transmission through hole is configured as a micropore structure; and/or the vibration sensor further includes an airflow buffering structure covering the vibration transmission through hole; and/or the support shell is provided with a plurality of vibration transmission through holes, and the plurality of the vibration transmission through holes are distributed in the support shell at intervals; and/or a volume of the first cavity is $V1$, and $V1$ is not less than 0.1 mm$^3$ and not greater than 20 mm$^3$.

In an embodiment of the present application, a pressure relief cavity is formed between the chip assembly and the shell, the shell is provided with a pressure relief hole communicating with the pressure relief cavity, and the MEMS element is provided with a first airflow channel communicating the second cavity with the pressure relief cavity.

In an embodiment of the present application, the pressure relief hole is staggered with the MEMS element.

In an embodiment of the present application, the vibration pick-up assembly is connected to the circuit board assembly to form a vibration cavity.

In an embodiment of the present application, the vibration pick-up assembly includes:

a support piece fixedly connected to the circuit board assembly;

an elastic vibration pick-up piece connected to the support piece, a side of the elastic vibration pick-up piece and the circuit board assembly being enclosed to form the vibration cavity, and another side of the elastic vibration pick-up piece, the chip assembly, and the support shell being enclosed to form the conduction cavity; and a vibration adjustment piece connected to the elastic vibration pick-up piece.

In an embodiment of the present application, the elastic vibration pick-up piece is connected to a side of the support piece away from the circuit board assembly, and a periphery of the elastic vibration pick-up piece is configured to cover the support piece, the support shell is connected to the side of the elastic vibration pick-up piece away from the support piece; and/or an avoidance groove is formed at a side of the circuit board assembly facing the vibration cavity; and/or a second airflow channel is provided at the elastic vibration pick-up piece and the vibration adjustment piece, and the second airflow channel communicates the conduction cavity with the vibration cavity.

In an embodiment of the present application, the circuit board assembly includes a stacked multi-layer circuit board.

The present application further provides an electronic equipment including a vibration sensor. The vibration sensor includes:

a circuit board assembly;

a shell configured to cover a side of the circuit board assembly to form an installation space;

a vibration pick-up assembly provided in the installation space, the vibration pick-up assembly being configured to pick up an external bone vibration and generate a response vibration;

a support shell connected to a side of the vibration pick-up assembly away from the circuit board assembly; and a chip assembly connected to a side of the support shell away from the circuit board assembly, the chip assembly being electrically connected to the circuit board assembly, and the vibration pick-up assembly, the support shell and the chip assembly being enclosed to form a conduction cavity.

In the vibration sensor according to the technical solution of the present application, the shell covers on one side of the circuit board assembly to directly form the installation space. In addition, the vibration pick-up assembly, the support shell and the chip assembly are all provided in the installation space. The support shell is fixed to the side of the vibration pick-up assembly away from the circuit board assembly, and then the vibration pick-up assembly is connected to the side of the support shell away from vibration pick-up assembly, so that the internal structure is compact and the installation is convenient. The conduction cavity is formed by an enclosure of the vibration pick-up assembly, the support shell and the chip assembly, so that the response vibration of the vibration pick-up assembly is transmitted to the chip assembly via the conduction cavity. In this way, the vibration sensor of the present application does not need to form a space for installing the chip assembly in the circuit board assembly, thereby reducing the number of exposed bonding positions of the circuit board assembly, simplifying the installation process, and ensuring the stability of the structure of the circuit board assembly. In this way, not only reliability risks can be reduced, but also there is no need to punch on the circuit board, thereby simplifying the structure of the vibration sensor and reducing processing difficulty and cost.

BRIEF DESCRIPTION OF THE DRAWINGS

To illustrate the technical solutions according to the embodiments of the present application or the related art more clearly, the accompanying drawings for describing the embodiments or the related art are introduced briefly in the following. Apparently, the accompanying drawings in the following description are only some embodiments in the present application. Persons skilled in the art can derive other drawings from the structures in the accompanying drawings without creative efforts.

FIG. 1 is a schematic structural view of a vibration sensor according to an embodiment of the present application.

The realization of the objective, functional characteristics, and advantages of the present application are further described with reference to the embodiments and the accompanying drawings.

DETAILED DESCRIPTION OF THE EMBODIMENTS

The technical solutions of the embodiments of the present application will be described in detail below with reference to the accompanying drawings. It is obvious that the embodiments described are only some rather than all of the embodiments of the present application. All other embodiments obtained by those skilled in the art based on the embodiments of the present application without creative efforts shall fall within the claimed scope of the present application.

It should be noted that all the directional indications (such as up, down, left, right, front, rear . . . ) in the embodiments of the present application are only used to explain the relative positional relationship, movement, or the like of the components in a certain posture (as shown in the drawings). If the specific posture changes, the directional indication will change accordingly.

In the present application, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those skilled in the art, the specific meaning of the above-mentioned terms in the present application can be understood according to specific circumstances.

Besides, the descriptions associated with, e.g., "first" and "second," in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. Moreover, the meaning of "and/or" appearing in the entire text can include three parallel schemes, taking "A and/or B as an example", including scheme A, or scheme B, or a scheme that satisfies both A and B In addition. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The present application proposes a vibration sensor 100.

As shown in FIG. 1, in an embodiment of the present application, the vibration sensor 100 includes a circuit board assembly 10, a shell 20, a vibration pick-up assembly 30, a support shell 50 and a chip assembly 40. The shell 20 covers a side of the circuit board assembly 10 to form an installation space 90. The vibration pick-up assembly 30 is provided in the installation space 90. The vibration pick-up assembly 30 is configured to pick up an external bone vibration and generate a response vibration. The support shell 50 is connected to a side of the vibration pick-up assembly 30 away from the circuit board assembly 10. The chip assembly 40 is connected to a side of the support shell 50 away from the circuit board assembly 10, and is electrically connected to the circuit board assembly 10. A conduction cavity 60 is formed by an enclosure among the vibration pick-up assembly 30, the support shell 50 and the chip assembly 40.

When operating, the vibration pick-up assembly 30 is configured to pick up bone vibrations from the outside world (such as the wearer or other vibration sources, the wearer will be used as an example below for description) to generate response vibrations. That is to say, the bone vibrations from the outside are transmitted to the vibration pick-up assembly 30, then the elastic vibration pick-up piece 32 of the vibration pick-up assembly 30 vibrates to generate a response vibration, and the response vibration is transmitted to the chip assembly 40 via the conduction cavity 60, so that the chip assembly 40 generates an electrical signal according to the received response vibration, and the electrical signal is electrically transmitted to the circuit board assembly 10.

In the vibration sensor 100 according to the technical solution of the present application, the shell 20 covers on one side of the circuit board assembly 10 to directly form the installation space 90. In addition, the vibration pick-up assembly 30, the support shell 50 and the chip assembly 40 are all provided in the installation space 90. The support shell 50 is fixed to the side of the vibration pick-up assembly 30 away from the circuit board assembly 10, and then the vibration pick-up assembly 10 is connected to the side of the support shell 50 away from the vibration pick-up assembly 30, so that the internal structure is compact and the installation is convenient. The conduction cavity 60 is formed by an enclosure of the vibration pick-up assembly 30, the support shell 50 and the chip assembly 40, so that the response vibration of the vibration pick-up assembly 30 is transmitted to the chip assembly 40 via the conduction cavity 60. In this way, the vibration sensor 100 of the present application does not need to form a space for installing the chip assembly 40 in the circuit board assembly 10, thereby reducing the number of exposed bonding positions of the circuit board assembly 10, simplifying the installation process, and ensuring the stability of the structure of the circuit board assembly 10. In this way, not only reliability risks can be reduced, but also there is no need to punch on the circuit board, thereby simplifying the structure of the vibration sensor 100 and reducing processing difficulty and cost.

In an embodiment of the present application, the chip assembly includes a micro-electromechanical system (MEMS) element 41 and an application specific integrated circuit (ASIC) chip 42. The MEMS element 41 is connected to a side of the support shell 50 away from the vibration pick-up assembly 30. The MEMS element 41, the support shell 50 and the vibration pick-up assembly 30 are enclosed to form the conduction cavity 60. The ASIC chip 42 is connected to the support shell 50 and is electrically connected to the MEMS element 41 and the circuit board assembly 10 respectively. The support shell 50 can be fixed at the side of the vibration pick-up assembly 30 away from the circuit board assembly 10. In addition, the MEMS element 41 and the ASIC chip 42 are installed at the same side of the support shell 50 away from the vibration pick-up assembly 30, which can provide an installation position for the MEMS element 41 and the ASIC chip 42. In this way, not only the stability after installation can be ensured, but also the early synchronous installation, later maintenance and disassembly can be facilitated. The MEMS element 41, the support shell 50 and the vibration pick-up assembly 30 are enclosed to form a conduction cavity 60, so that the response vibration of the vibration pick-up assembly 30 can be transmitted to the MEMS element 41, to allow the MEMS element 41 to receive the response vibration. Then the response vibration can be electrically transmitted to the ASIC chip 42 for processing and outputting the electrical signal. The MEMS element 41 may be a capacitive structure, a piezoresistive structure or a piezoelectric structure.

In an embodiment of the present application, the support shell 50 and the vibration pick-up assembly 30 are enclosed to form a first cavity 61, and the MEMS element 41 and the support shell 50 are enclosed to form a second cavity 62. The support shell 50 is provided with a vibration transmission through hole 51, and the first cavity 61 communicates with the second cavity 62 via the vibration transmission through hole 51 to form the conduction cavity 60. It can be understood that the support shell 50 and the vibration pick-up assembly 30 are enclosed to form a first cavity 61, thereby forming a vibration space for the elastic vibration pick-up piece 32 of the vibration pick-up assembly 30. In addition, a vibration transmission through hole 51 is punched at the support shell 50, so that a response vibration is formed in the first cavity 61 after the vibration of the vibration pick-up assembly 30, and the response vibration is transmitted to the second cavity 62 enclosed by the MEMS element 41 and the support shell 50 via the vibration transmission through hole 51. Therefore, the MEMS element 41 can receive the response vibration and can electrically transmit the response vibration to the ASIC chip 42 for processing and outputting the electrical signal.

In an embodiment of the present application, micropores are provided in the vibration transmission through hole 51. The diameter of the micropores can range from 1 um to 100 um. By setting the vibration transmission through holes 51 with the micropore structure, a damping role can be played in the airflow flowing between the first cavity 61 and the second cavity 62, thereby limiting the peak sensitivity of the vibration sensor 100. In this way, not only the frequency response characteristics of the vibration sensor 100 can be improved, but also the operation bandwidth width of the vibration sensor 100 can be expanded, thereby improving the product performance.

In an embodiment of the present application, the vibration sensor 100 further includes an airflow buffer structure (not shown), and the airflow buffer structure covers the vibration transmission through hole 51. In order to further improve the damping effect on the vibration transmission through hole 51, the airflow buffering structure can be provided at the vibration transmission through hole 51. The airflow buffering structure can be a breathable film or an adapter sheet with micropores, and the like. In this way, the frequency response characteristics of the vibration sensor 100 can be further improved, and the operation bandwidth width of the vibration sensor 100 can be expanded, thereby improving the product performance.

In an embodiment of the present application, there are a plurality of vibration transmission through holes 51, and the plurality of vibration transmission through holes 51 are spaced apart at the support shell 50. A plurality of vibration transmission through holes 51 can be provided to ensure the normal fluidity of the airflow flowing between the first cavity 61 and the second cavity 62 when a single vibration transmission through hole 51 is blocked and fails.

In an embodiment of the present application, the volume of the first cavity 61 is V1, and V1 is not less than 0.1 mm$^3$ and not greater than 20 mm$^3$. The first volume V1 ranges from 0.1 mm$^3$ to 20 mm$^3$, thus the vibration space required by the elastic vibration pick-up piece 32 can be obtained, and a too large overall volume of the vibration sensor 100 can also be avoided.

In an embodiment of the present application, as shown in FIG. 1, a pressure relief cavity 80 is formed between the chip assembly 40 and the shell 20, the shell 20 is provided with a pressure relief hole 21 communicating with the pressure relief cavity 80, and the MEMS element 41 is provided with a first airflow channel 411 communicating the second cavity 62 with the pressure relief cavity 80. When the vibration pick-up assembly 30 vibrates, the pressure of each cavity in the installation space 90 formed by the shell 20 and the circuit board assembly 10 will change. In order to ensure the stability of the components in the installation space 90, a pressure relief cavity 80 is formed between the chip assembly 40 and the shell 20, and a pressure relief hole 21 communicating with the pressure relief cavity 80 is provided at the shell 20. The MEMS element 41 is provided with a first airflow channel 411 communicating the second cavity 62 with the pressure relief cavity 80. In this way, after the vibration pick-up assembly 30 vibrates, the airflow in the internal space of the second cavity 62 can flow to the pressure relief cavity 80 via the first airflow channel 411 and flow to the outside world via the pressure relief hole 21, thereby ensuring the normal use of each component in the installation space 90. It should be noted that the MEMS element 41 is a capacitor structure, which can be the single diaphragm/the single back pole, the dual diaphragm/the single back pole, the single diaphragm/the double back pole, and the like. An air relief hole for releasing air is provided at the diaphragm to form the first airflow channel 411. The air relief hole can be shaped in a circular hole with a diameter of 1 um~30 um, or can be shaped in a fan-shaped gap with a gap width of 0.2 um~20 um. When the MEMS element 41 is a piezoresistive structure or a piezoelectric structure, a fan blade structure can be selected, and the number can range from 1 to 50. The fan blade gap may range from 0.1 um to 30 um. In addition, a gas connection channel can also be provided between the pressure relief cavity 80 and the vibration cavity 70 formed by an enclosure of the vibration pick-up assembly 30 and the circuit board assembly 10. The shape of the channel is not limited here, and the opening area can range from 1 $um^2$ to 1000 $um^2$. The opening of the channel can be provided at the circuit board assembly 10, or at the vibration pick-up assembly 30, or at a connection position between the circuit board assembly 10 and the vibration pick-up assembly 30. Of course, an additional conduit can be provided for communication, and the specific selection can be made by those skilled in the art.

In an embodiment of the present application, the pressure relief hole 21 is staggered with the MEMS element 41. In order to prevent external light and other factors from directly passing through the pressure relief hole 21 and affecting the normal operation of the MEMS element 41, the position of the pressure relief hole 21 at the shell 20 is staggered with the MEMS element 41, to ensure the operation stability of the MEMS element 41, thereby improving reliability.

In an embodiment of the present application, as shown in FIG. 1, the vibration pick-up assembly 30 is connected to the circuit board assembly 10 to form a vibration cavity 70.

It should be noted that the elastic vibration pick-up piece 32 of the vibration pick-up assembly 30 vibrates in two directions during operation, thus the vibration pick-up assembly 30 is connected to the circuit board assembly 10 and is synchronously enclosed to form the vibration cavity 70, which provides a vibration space for the elastic vibration pick-up piece 32 and can ensure the sensitivity of the vibration pick-up assembly 30. The volume of the vibration cavity 70 can range from 0.1 $mm^3$ to 20 $mm^3$, so that the vibration space required by the elastic vibration pick-up piece 32 can be obtained, and a too large overall volume of the vibration sensor 100 can be avoided. The chip assembly 40 is connected to the side of the vibration pick-up assembly 30 away from the circuit board to form the conduction cavity 60, so that during installation, the vibration pick-up assembly 30 and the chip assembly 40 can be assembled with the circuit board assembly 10 first, and then the shell 20 is covered at the circuit board assembly 10. In this way, the installation process can be simplified, the installation efficiency can be improved, and the internal components can be covered and protected.

In an embodiment of the present application, the vibration pick-up assembly 30 includes a support piece 31, an elastic vibration pick-up piece 32 and a vibration adjustment piece 33. The support piece 31 is fixedly connected to the circuit board assembly 10. The elastic vibration pick-up piece 32 is connected to the support piece 31. One side of the elastic vibration pick-up piece 32 and the circuit board assembly 10 are enclosed to form the vibration cavity 70. The other side of the elastic vibration pick-up piece 32, the chip assembly 40 and the support shell 50 are enclosed to form the conduction cavity 60. The vibration adjustment piece 33 is connected to the elastic vibration pick-up piece 32. The support piece 31 is fixedly connected to the circuit board assembly 10 to ensure the stability of the installation of the vibration pick-up assembly 30, and the elastic vibration pick-up piece 32 is connected to the support piece 31. The conduction cavity 60 and the vibration cavity 70 are respectively provided at the upper and lower sides of the elastic vibration pick-up piece 32, so that when the elastic vibration pick-up piece 32 vibrates and generates a response vibration, the pressure of the conduction cavity 60 and the vibration cavity 70 will be affected. The elastic vibration pick-up part 32 can be made of organic polymer film or glue, metal sheet or other elastic materials. The vibration area can range from 0.2 $mm^2$ to 200 $mm^2$, which can ensure the vibration amplitude of the elastic vibration pick-up part 32, and the vibration adjustment piece 33 can be shaped in a circular, a square or a rectangular block structure, and the weight can range from 0.2 mg to 20 mg. The vibration adjustment piece 33 can be at the upper part, the lower part of the elastic vibration pick-up piece 32, or can be embedded in the elastic vibration pick-up piece 32. In this way, the vibration adjustment piece 33 can increase the amplitude of the response vibration generated when the elastic vibration pick-up piece 32 receives the bone vibration.

In an embodiment of the present application, the elastic vibration pick-up piece 32 is connected to a side of the support piece 31 away from the circuit board assembly 10. A periphery of the elastic vibration pick-up piece 32 is configured to cover the support piece 31, and the support shell 50 is connected to the side of the elastic vibration pick-up piece 32 away from the support piece 31. The support piece 31, the elastic vibration pick-up piece 32 and the support shell 50 are stacked and installed sequentially along the direction away from the circuit board assembly 10, which facilitates the processing of the vibration sensor 100 as a whole, thereby improving the installation efficiency.

In an embodiment of the present application, an avoidance groove 11 is formed at a side of the circuit board assembly 10 facing the vibration cavity 70. In order to further increase the vibration space of the vibration cavity 70, the avoidance groove 11 can be formed at a side of the circuit board assembly 10 facing the vibration cavity 70, and the depth can range from 10 mm to 1000 mm, so as to ensure that the vibration amplitude of the elastic vibration pick-up piece 32 will not be affected when the elastic vibration pick-up piece 32 vibrates in the vibration cavity 70, thereby improving the vibration sensitivity of the vibration pick-up assembly 30.

In an embodiment of the present application, the elastic vibration pick-up piece 32 and the vibration adjustment piece 33 are provided with a second airflow channel 34, and the second airflow channel 34 communicates the conduction cavity 60 with the vibration cavity 70. The second airflow channel 34 is provided in the elastic vibration pick-up piece 32 and the vibration adjustment piece 33 to communicate the conduction cavity 60 with the vibration cavity 70, so as to ensure the stability of the airflow in the conduction cavity 60 and the vibration cavity 70. The shape of the second airflow channel 34 is not limited, and the opening area can range from 1 um$^2$ to 1000 um$^2$. The opening of the second airflow channel 34 can be provided at the elastic vibration pick-up part 32, or at the vibration adjustment part 33, or the connection position between the elastic vibration pick-up part 32 and the vibration adjustment part 33. Of course, an additional conduit can also be set for communication, which can be selected by those skilled in the art. The second airflow channel 34 can dampen the airflow flowing between the conduction cavity 60 and the vibration cavity 70, which can not only limit the peak sensitivity of the vibration sensor 100 and improve the frequency response characteristics of the vibration sensor 100, but also can expand the operation bandwidth width of the vibration sensor 100, thereby improving the product performance.

In an embodiment of the present application, the circuit board assembly 10 includes a stacked multi-layer circuit board. In order to ensure the overall structural strength of the circuit board assembly 10 and ensure the stability of the support shell 20, the multi-layer circuit board can be stacked to ensure the overall stability of the circuit board assembly 10 and further reduce the number of exposed bonding positions of the circuit board assembly 10, thereby reducing reliability risks. The number of circuit boards can be set by those skilled in the art according to specific circumstances.

The present application further provides an electronic equipment, which may be, but is not limited to, a head-mounted equipment, earphones, a smart watch, a smart bracelet, a vehicle-mounted noise reduction equipment, a vibration sensing device, and other electronic equipments well known to those skilled in the art. The electronic equipment includes a vibration sensor 100. The specific structure of the vibration sensor 100 may refer to the above-mentioned embodiments. Since this electronic equipment adopts all the technical solutions of the above-mentioned embodiments, it has at least all the benefits brought by the technical solutions of the above-mentioned embodiments, and the effects will not be repeated here.

The above are only some embodiments of the present application, and do not limit the scope of the present application thereto. Under the concept of this application, any equivalent structural transformation made according to the description and drawings of the present application, or direct/indirect application in other related technical fields shall fall within the claimed scope of the present application.

What is claimed is:

1. A vibration sensor, comprising:
a circuit board assembly;
a shell configured to cover a side of the circuit board assembly to form an installation space;
a vibration pick-up assembly provided in the installation space, wherein the vibration pick-up assembly is configured to pick up an external bone vibration and generate a response vibration;
a support shell connected to a side of the vibration pick-up assembly away from the circuit board assembly; and a chip assembly connected to a side of the support shell away from the circuit board assembly, wherein the chip assembly is electrically connected to the circuit board assembly, and the vibration pick-up assembly, the support shell and the chip assembly are enclosed to form a conduction cavity;
wherein the vibration pick-up assembly is connected to the circuit board assembly to form a vibration cavity;
the vibration pick-up assembly comprises:
a support piece fixedly connected to the circuit board assembly;
an elastic vibration pick-up piece connected to the support piece, wherein a side of the elastic vibration pick-up piece and the circuit board assembly are enclosed to form the vibration cavity, and another side of the elastic vibration pick-up piece, the chip assembly, and the support shell are enclosed to form the conduction cavity; and
a vibration adjustment piece connected to the elastic vibration pick-up piece; and
the elastic vibration pick-up piece is connected to a side of the support piece away from the circuit board assembly, and a periphery of the elastic vibration pick-up piece is configured to cover the support piece, the support shell is connected to the side of the elastic vibration pick-up piece away from the support piece.

2. The vibration sensor according to claim 1, wherein the chip assembly comprises:
a micro-electromechanical system (MEMS) element connected to a side of the support shell away from the vibration pick-up assembly, wherein the MEMS element, the support shell and the vibration pick-up assembly are enclosed to form the conduction cavity; and
an application specific integrated circuit (ASIC) chip connected to the support shell, wherein the ASIC chip is electrically connected to the MEMS element and the circuit board assembly respectively.

3. The vibration sensor according to claim 2, wherein the support shell and the vibration pick-up assembly are enclosed to form a first cavity, the MEMS element and the support shell are enclosed to form a second cavity, the support shell is provided with a vibration transmission through hole, and the first cavity communicates with the second cavity via the vibration transmission through hole to form the conduction cavity.

4. The vibration sensor according to claim 3, wherein:
the vibration transmission through hole is configured as a micropore structure; and/or
the vibration sensor further comprises an airflow buffering structure covering the vibration transmission through hole; and/or
the support shell is provided with a plurality of vibration transmission through holes, and the plurality of vibration transmission through holes are distributed in the support shell at intervals; and/or
a volume of the first cavity is V1, and V1 is not less than 0.1 mm3 and not greater than 20 mm3.

5. The vibration sensor according to claim 3, wherein:
a pressure relief cavity is formed between the chip assembly and the shell, the shell is provided with a pressure relief hole communicating with the pressure relief cavity, and the MEMS element is provided with a first airflow channel communicating the second cavity with the pressure relief cavity.

6. The vibration sensor according to claim 5, wherein the pressure relief hole is staggered with the MEMS element.

7. The vibration sensor according to claim 1, wherein the circuit board assembly comprises a stacked multi-layer circuit board.

8. An electronic equipment, comprising the vibration sensor according to claim 1.

* * * * *